UNITED STATES PATENT OFFICE.

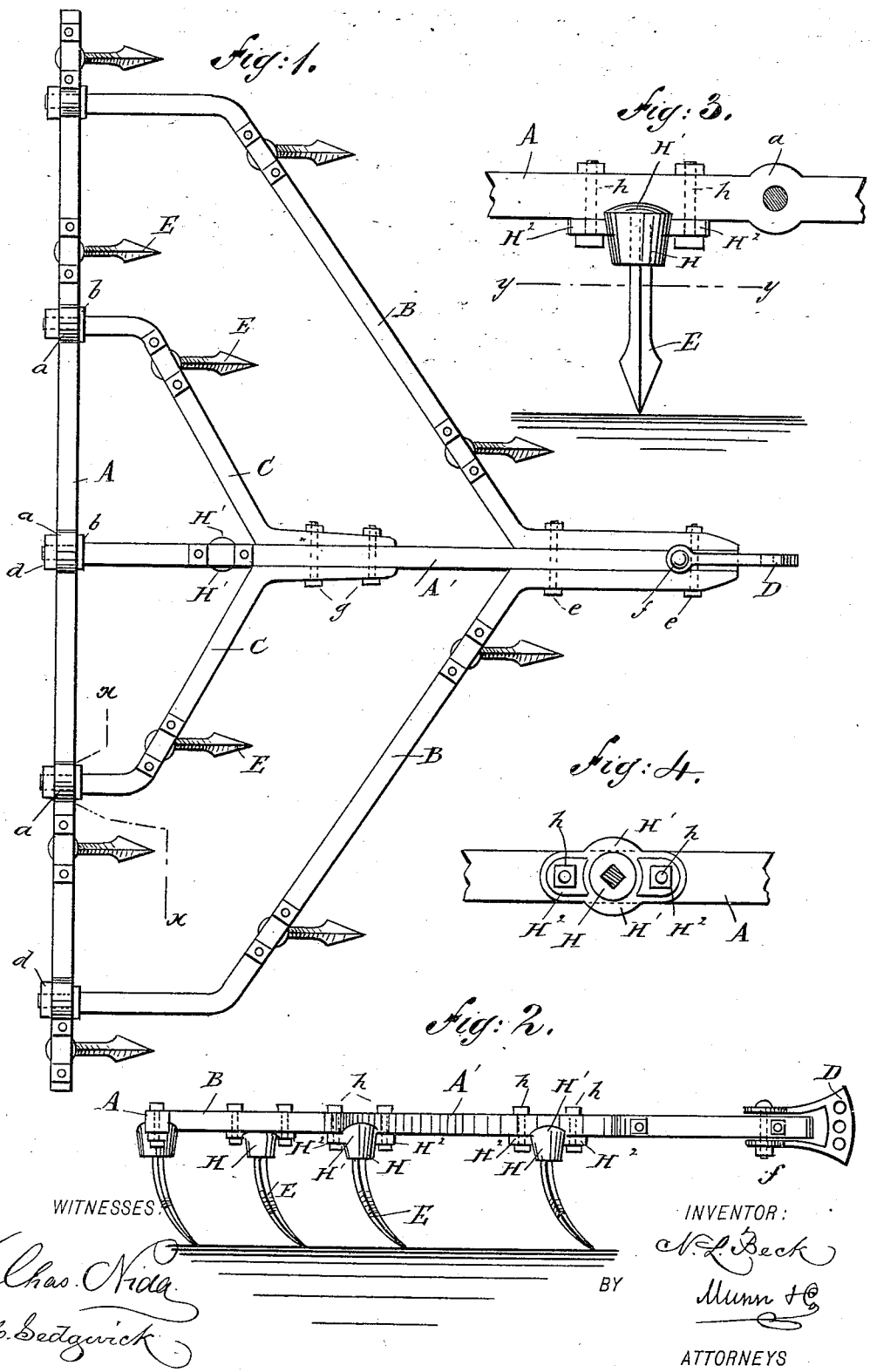

NIELS L. BECK, OF BRAYTON, IOWA.

HARROW.

SPECIFICATION forming part of Letters Patent No. 426,704, dated April 29, 1890.

Application filed December 17, 1889. Serial No. 334,069. (No model.)

*To all whom it may concern:*

Be it known that I, NIELS L. BECK, of Brayton, in the county of Audubon and State of Iowa, have invented a new and useful Harrow, of which the following is a full, clear, and exact description.

My invention relates to improvements in harrows; and the object of my invention is to provide a metal harrow that will be simple in construction, efficient in its work, and that will be durable and cheap.

To this end my invention consists of a metal harrow-frame made, preferably, of iron or steel, broad at the rear and narrow in front, having forwardly-projecting teeth attached to the bars of the frame in such a manner that they will be held and braced firmly thereon. This construction will be hereinafter fully described, and specifically pointed out in the claim.

Reference is to be had to the accompanying drawings, forming a part of this specification, in which similar letters of reference indicate corresponding parts in all the views.

Figure 1 is a plan view of the harrow; Fig. 2, a side elevation of the same; Fig. 3, an enlarged section on the line $x\ x$ of Fig. 1, showing the manner in which the harrow-teeth are attached to the frame; and Fig. 4, a section on the line $y\ y$ of Fig. 3, looking upward toward the frame.

The bar A, which extends across the entire rear end of the harrow, the cross-bar A′, which is attached to the center of the bar A and extends forward at right angles with the same, and the side bars B and C, which are attached to the bar A and cross-bar A′, constitute the frame of the harrow, all of said bars being constructed of iron or steel. The bar A is enlarged and tapped at the points $a$, where it receives the ends of the bars A′, B, and C, and the ends of said bars are provided with screw-threads and shoulders $b$, so that said ends may be thrust through the holes in the bar A and retained by nuts $d$, which may be tightened until the shoulders $b$ bear against the front part of the bar A, thus firmly uniting it to the ends of the bars A′, B, and C. The bars B form the sides of the harrow-frame, and their rear ends are attached to the bar A in the manner described. They project forwardly and inwardly, so as to meet the cross-bar A′ near the forward end thereof, at which point they are bent so as to extend forward beside the bar A′, to which they are attached by the bolts $e$, so that the united ends of the bars A′ and B form a projecting end to the harrow, to which the clevis D is attached by the bolt $f$.

The clevis D is of the usual construction, and the harrow may be made to cleave the ground harder or lighter as the draft is applied to the different holes of the clevis.

The bars C are of the same shape as the bars B, but are shorter and form the interior of the frame. They are attached to the bar A, as described, and are bent forward and attached to the sides of the bar A′ about midway between the bars A and B by the bolts $g$.

The harrow is provided with forwardly-projecting teeth E, having their upper ends provided with a head H, which rests against the under side of the bars A, A′, B, and C, said head having lips H′, which clasp the bars, and thus prevent the teeth from being moved in a lateral direction, and ears $H^2$, which extend from opposite sides of the head and are attached to the bars of the frame by the bolts $h$, so that the teeth E are thereby held against the frame and prevented from sliding upon the bars of the frame. The heads H should be attached to the teeth E in such a manner that the teeth will point forward and the lips H′ and ears $H^2$ will assume their proper positions upon the bars of the frame. For instance, the teeth upon the bar A should have the heads H attached so that the ears $H^2$ will extend at right angles to the front of the teeth. The ears will thus bear upon the under side of the bar and the lips H′ will clasp the bar in front and behind. The teeth that are attached to the bar A′ should have the head attached so that the ears $H^2$ will be in line with the teeth, and the teeth that are to be attached to the bars B and C should have the head attached so that the ears $H^2$ will extend outwardly at an angle of about forty-five degrees with the front of the teeth. By attaching or casting the heads H in this manner the top of the head and the ears $H^2$ will rest against the under side of the several bars, the lips H′ will clasp the same, and the teeth E will project forwardly, as they should. The lips H′ should project well up the sides of the bars composing the harrow-frame and should be made sufficiently strong to prevent the teeth E from being forced backward, and the ears H² should be very strong. They should have their top surface flush with the top of the head H, so that they will rest firmly against the under side of the harrow-frame, and they are attached thereto by the bolts $h$, which pass through holes in said ears and in the harrow-frame and are provided at the upper end with suitable nuts to hold them in place.

From the foregoing description it will be seen that the harrow-teeth cannot move in any direction, and the shape of the harrow is such that it will thoroughly pulverize the soil and will not easily clog.

Having thus described my invention, I claim as new and desire to secure by Letters Patent—

A harrow having a metal frame comprising the bars A, A', B, and C, and teeth E, having heads H with lips H' and ears H², all constructed and arranged substantially as shown and described.

NIELS L. BECK.

Witnesses:
JENS PETER NIELSEN,
NIELS PETERSON.